UNITED STATES PATENT OFFICE.

WALTER GLAESER, OF BROOKLYN, NEW YORK, ASSIGNOR TO GEORGE T. BISHOP, OF CLEVELAND, OHIO.

PROCESS OF MAKING WINDOW-GLASS AND HYDROCHLORIC ACID.

1,234,457.   Specification of Letters Patent.   Patented July 24, 1917.

No Drawing.   Application filed May 1, 1916.   Serial No. 94,605.

*To all whom it may concern:*

Be it known that I, WALTER GLAESER, a subject of the German Emperor, and a resident of Brooklyn, county of Kings and State of New York, have invented a new and useful Improvement in Process of Making Window-Glass and Hydrochloric Acid, (Case 9,) of which the following is a specification, the principle of the invention being herein explained and the best mode in which I have contemplated applying that principle, so as to distinguish it from other inventions.

The present invention relates to a method of making window glass with hydrochloric acid as a by-product, or it may be considered as a method of making hydrochloric acid with window glass as a by-product, since in either case these two compounds are obtained from the present method. To the accomplishment of the foregoing and related ends, said invention, then, consists of the means hereinafter set forth and particularly pointed out in the claim.

The following description sets forth in detail one approved method of carrying out the invention, such disclosed mode, however, constituting but one of the various ways in which the principle of the invention may be used.

The ordinary window glass is substantially a calcium-sodium-silicate, which is usually prepared by fusing a mixture of sand, lime or lime-stone, with sodium carbonate. I have found that by heating together in an open kiln a mixture of sand, lime or lime-stone, sodium chlorid, and coke in the presence of water and at a temperature of approximately 800° C. that a very good grade of window glass can be obtained, and also a relatively pure hydrochloric acid. This mixture should be heated for about two hours at the highest temperature below which the sodium chlorid in the mixture will not fuse, which is aproximately 800° C. under ordinary atmospheric conditions.

By the heating of this mixture the sand-calcium chlorid-coke mixture is completely decomposed with the formation of a calcium silicate and with the formation of hydrochloric acid gas, which is of course given off. The various reactions which take place without the addition of coke during this heating may be illustrated as follows:—

(1) $C+O=CO$
(2) $2NaCl+CO=Na_2O+Cl_2+C$
(3) $Cl_2+H_2O=2HCl+O$
(4) $C$ (from (2)) $+O$ (from (3)) $=CO$ Thus:

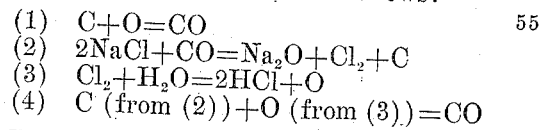

Or the reactions may be indicated:—

(1) $CaO+2NaCl=CaCl_2+Na_2O$
(2) $SiO_2+Na_2O=Na_2SiO_3$
(3) $C+O=CO$
(4) $CaCl_2+CO=CaO+Cl_2+C$
(5) $SiO_2+CaO=CaSiO_3$
(6) $Cl_2+H_2O=2HCl+O$
(7) $C$ (from 4) $+O$ (from 6) $=CO$ Thus:

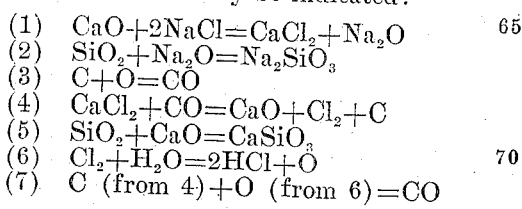

The addition of coke is essential in order to insure quick and complete decomposition of the salt. Without coke a higher temperature must be employed, but even then the decomposition proceeds only very slowly and is incomplete. In the former case the decomposition is effected by the action of the carbon monoxid formed upon sodium or calcium chlorid; (compare with equations shown above); while in the latter case—if coke is omitted—decomposition of the chlorid is caused by the action of oxygen upon sand-sodium or calcium chlorid mixtures, as is shown by the following equations:

1. $CaO+2NaCl=CaCl_2+Na_2O$
2. $SiO_2+CaCl_2+O=CaSiO_3+Cl_2$

Or the reactions may be indicated:—

1. $SiO_2+CaO=CaSiO_3$
2. $SiO_2+2NaCl+O=Na_2SiO_3+Cl_2$

I have found, as stated before, that carbon monoxid reacts upon sand—sodium chlorid mixtures much more quickly and efficiently than oxygen, insuring complete decomposition of the salt used.

It is not important as to whether lime or lime-stone be used in the mixture, the reactions being similar in either case, and if lime-stone is used carbonic acid being produced in addition to the other products.

The various amounts of each material which will be required in the mixture may be readily calculated from the foregoing reaction equations, but I have found that a suitable mixture consists of 100 parts sand, 41 parts sodium chlorid, 26 parts of limestone, and about 15 parts of coke, which will be mixed in any suitable apparatus such for example as the ball mill, and then slowly and continuously fed into a rotary kiln. If the kiln is not of the rotary type, then it will be necessary to supply some means for stirring or agitating the mixture during the heating in order to secure a homogeneous product.

As will be seen from the foregoing reaction equations, the chlorids are decomposed with the liberation of hydrochloric acid and the formation of free bases which combine at once with the sand to produce a double silicate of sodium and calcium of substantially the same chemical composition as window glass. The exact composition may, of course, be varied by changing the proportions of the mass to be furnaced. The hydrochloric acid formed may be collected in suitable devices while the calcium sodium silicate is run into a glass melting furnace and fused.

The foregoing process is a simple one by which both hydrochloric acid and window glass may be produced from relatively inexpensive and abundant materials.

Other modes of applying the principle of my invention may be employed instead of the one explained, change being made as regards the process herein disclosed, provided the step or steps stated by the following claim or the equivalent of such stated step or steps be employed.

I therefore particularly point out and distinctly claim as my invention:—

In a process of making window glass, the step which consists in heating a mixture of sand, lime, sodium chlorid and carbon at a temperature of approximately 800° C. in the presence of steam in an open kiln.

Signed by me this 28 day of April, 1916.

WALTER GLAESER.

Attested by—
D. T. DAVIES,
F. M. RECKTENWALT.